UNITED STATES PATENT OFFICE.

NATHAN GRÜNSTEIN, OF FRANKFORT-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

PROCESS FOR PRODUCING ACETIC ACID.

1,174,250.  Specification of Letters Patent.  Patented Mar. 7, 1916.

No Drawing.   Application filed June 4, 1914.   Serial No. 842,949.

*To all whom it may concern:*

Be it known that I, NATHAN GRÜNSTEIN, a citizen of the Russian Empire, and resident of Frankfort-on-the-Main, Germany, have invented new and useful Improvements of Processes for Producing Acetic Acid, of which the following is a specification.

Hitherto the technical production of acetic acid from acetylene was performed in such a manner that the acetaldehyde obtained by the hydration of acetylene was isolated and then converted into acetic acid by a separate operation. The production of acetic acid from aldehyde was performed in such manner, that for instance pure acetaldehyde was treated with oxygen or air in the presence of a great deal of acetic acid, monochloracetic acid or the like, whereby the oxidation could be accelerated by the addition of oxygen carrying bodies, as for instance ferrous-ferric-oxid, vanadium pentoxid, uranic oxid and the like. Now I have discovered that the process of manufacturing acetic acid from acetylene may be simplified and that the expensive separation and purification of the acetaldehyde may be avoided by directly producing the acetic acid from acetylene. This may be done by treating acetic acid, containing water, and to which mercury salts have been added, with acetylene and oxygen, whereby the obtained acetaldehyde is converted into acetic acid in the same solution. Instead of acetic acid which is a water-soluble aliphatic acid monochloracetic acid and some other organic acids may be used as reaction-liquid; but in this case the obtained acetic acid must be separated by fractional distillation from monochloracetic acid or the like.

The hydration of the acetylene is accelerated by the addition of small quantities of sulfuric acid, phosphoric acid or the like, while the oxidation of the acetaldehyde is very favorably influenced by adding oxygen carriers, such as the oxids of iron, vanadium pentoxid and the like.

The process may for instance be carried out in such a manner, that into an acetic acid, containing water, and to which mercuric or mercurous salts have been added, acetylene and oxygen are alternately introduced. The amount of oxygen must correspond to that necessary for the formation of acetic acid from acetaldehyde by oxidation; thereby the acetic acid is obtained in a smooth manner. Preferably the acetylene is introduced during a short time only and then the produced aldehyde is at once oxidized by means of oxygen. The simultaneous introduction of both, acetylene and oxygen, is likewise possible, but it is to be remarked, that the absorption of the gases is thereby retarded. Preferably the process is carried out in a concentrated acid, as with a higher content of water the oxidation of the acetaldehyde to acetic acid is likewise retarded. As soon as a sufficient quantity of acetic acid has been formed in the apparatus the clear solution is drawn off, whereby an acetic acid of high percentage is obtained, which contains but the water, which has been added in excess. The acid may be purified by distillation or by any other known method.

The present invention shows the great advantage, that the acetic acid can be produced in one operation from acetylene, water and oxygen, so that the expensive separation of the acetaldehyde is avoided, which involves unavoidable loss. When using concentrated acetic acid as reaction-liquid an acetic acid of high percentage is obtained. It is very remarkable, that with this process, also when using diluted acetic acid, the acetaldehyde is still oxidized to acetic acid by the oxygen, while pure acetaldehyde gives no reaction with oxygen when brought together in an acetic acid of the same concentration. Besides the process is a very favorable one due to the fact, that the mercury salt, which acts in a catalytical manner, is reduced but very slowly to metallic mercury, so that only a small quantity of mercury is used.

The following example illustrates the manner, in which the invention may be carried out, but I do not limit myself thereto. To 200 parts of acetic acid 90% are added 10 parts mercuric oxid; one part sulfuric acid or 2 parts phosphoric acid may or may not be added thereto. Acetylene is introduced while strongly agitating during some time, say one hour; the temperature being kept at about 70–90°C. Then the amount of oxygen, which is necessary for oxidizing the formed acetaldehyde to acetic acid is introduced. In the same manner acetylene and oxygen are alternately introduced, while the water, which has been consumed for the formation of aldehyde is replaced continuously or periodically. The impurities which during the process become collected in the apparatus, and by which the reaction is retarded, as for instance nitrogen or carbon dioxid, are eliminated by passing a powerful stream of oxygen through the apparatus or by any other suitable means. The produced acetic acid is drawn off from time to time, while the process is continued. By the above process an acetic acid of about 95% is obtained with a yield of 90-100% of the theory. By distillation pure glacial acetic acid may be obtained therefrom. It is to be remarked, that the mercury salt, especially when the process is carried out on a larger scale, is consumed in a remarkably small degree, so that fresh catalytic substances need not be added but very rarely. In case a diluted acetic acid is used as reaction liquid, the concentration thereof will gradually rise, as water is consumed by the formation of aldehyde. Therefore while starting from diluted acetic acid one can obtain a concentrated acid or it is possible to vary the concentration according to the added water. When instead of acetic acid monochloracetic acid, or another suitable organic acid is used as reaction liquid, the produced acetic acid is separated from the mixture by fractional distillation. Instead of mercuric or mercurous oxid there may be used other mercuric or mercurous compounds, as for instance mercuric or mercurous sulfate, phosphate or the like. Or there may be used mixtures of such salts or compounds. When mercuric sulfate or phosphate is used, it is not more necessary to add free sulfuric acid, phosphoric acid or the like. The mercury which has been used as a catalytical body during the process may be regenerated and introduced once more in the process. The fresh contact bodies may be added continuously or periodically.

When in the claims I speak of acetic acid, I mean by that expression to include also a substituted acetic acid, particularly a chloracetic acid.

Now what I claim and desire to secure by Letters Patent is the following:

1. The process of producing acetic acid, which consists in allowing to react on each other acetylene, water and oxygen in the presence of acetic acid and a mercury compound substantially as described.

2. The process of producing acetic acid, which consists in allowing to react on each other acetylene, water and oxygen in the presence of acetic acid, a mercury compound and an oxygen carrier substantially as described.

3. The process of producing acetic acid, which consists in allowing to react on each other acetylene, water and oxygen in the presence of acetic acid, a mercury compound and an inorganic acid substantially as described.

4. The process of producing acetic acid, which consists in allowing to react on each other acetylene, water and oxygen in the presence of acetic acid, a mercury compound and phosphoric acid substantially as described.

5. The process of producing acetic acid, which consists in introducing acetylene and oxygen into acetic acid in the presence of water and a mercury compound substantially as described.

6. The process of producing acetic acid, which consists in introducing acetylene and oxygen alternately into acetic acid in the presence of water and a mercury compound substantially as described.

7. The process of producing acetic acid, which consists in introducing acetylene and oxygen alternately into acetic acid in the presence of water, a mercury compound and an oxygen carrier substantially as described.

8. The process of producing acetic acid, which consists in introducing acetylene and oxygen alternately into acetic acid in the presence of water, a mercury compound and an inorganic acid substantially as described.

9. The process of producing acetic acid, which consists in introducing acetylene and oxygen alternately into acetic acid in the presence of water, a mercury compound and phosphoric acid substantially as described.

10. The manufacture of acetic acid by allowing to react on each other acetylene, oxygen and water in the presence of an aliphatic acid and a mercury compound.

11. The manufacture of acetic acid by allowing to react on each other acetylene, oxygen and water in the presence of an aliphatic acid, a mercury compound and an accelerating agent.

12. The manufacture of acetic acid by allowing to react on each other acetylene, oxygen and water in the presence of an aliphatic acid, a mercury compound and an oxygen carrier.

13. The manufacture of acetic acid by allowing to react on each other acetylene, oxygen and water in the presence of an aliphatic acid, a mercury compound and an inorganic acid.

14. The manufacture of acetic acid by introducing acetylene and oxygen into an aliphatic acid in the presence of water and a mercury compound.

15. The manufacture of acetic acid by introducing acetylene and oxygen alternately into an aliphatic acid in the presence of water and a mercury compound.

16. The manufacture of acetic acid by introducing acetylene and oxygen into an aliphatic acid in the presence of water, a mercury compound, and an accelerating agent.

17. The process of producing acetic acid, which consists in allowing to react on each other acetylene, water and oxygen in the presence of acetic acid, a mercury compound and an accelerating agent substantially as described.

18. The process of producing acetic acid, which consists in introducing acetylene and oxygen alternately into acetic acid in the presence of water, a mercury compound and an accelerating agent substantially as described.

19. The manufacture of acetic acid by allowing to react on each other acetylene, oxygen and water in the presence of a water-soluble aliphatic acid and a mercury compound.

20. The manufacture of acetic acid by allowing to react on each other acetylene, oxygen and water in the presence of a water-soluble aliphatic acid, a mercury compound and an inorganic acid.

21. The manufacture of acetic acid by introducing acetylene and oxygen into a water-soluble aliphatic acid in the presence of water and a mercury compound.

22. The manufacture of acetic acid by introducing acetylene and oxygen alternately into a water-soluble aliphatic acid in the presence of water and a mercury compound.

That I claim the foregoing as my invention, I have signed my name in presence of two witnesses, this twenty-seventh day of May 1914.

NATHAN GRÜNSTEIN.

Witnesses:
 JEAN GRUND,
 CARL GRUND.